United States Patent [19]

Thissen et al.

[11] Patent Number: 4,566,859

[45] Date of Patent: Jan. 28, 1986

[54] METHOD FOR CARRYING LIQUID METAL BY TWO SERIES-CONNECTED ELECTRIC MAGNET PUMPS

[75] Inventors: Klaus Thissen, Cologne; Joachim Barzantny, Kürten-Eichhof, both of Fed. Rep. of Germany

[73] Assignee: Interatom Internationale Atomreaktorbau GmbH, Bergisch-Gladbach, Fed. Rep. of Germany

[21] Appl. No.: 578,548

[22] Filed: Feb. 9, 1984

[30] Foreign Application Priority Data

Jun. 20, 1983 [DE] Fed. Rep. of Germany ....... 3322122

[51] Int. Cl.⁴ .............................................. H02K 44/02
[52] U.S. Cl. ......................................... 417/50; 417/53; 222/590; 266/237
[58] Field of Search ..................... 222/590, 591, 594; 266/237; 417/50, 53

[56] References Cited

U.S. PATENT DOCUMENTS

| | | | |
|---|---|---|---|
| 3,875,991 | 4/1975 | Korshunov | 417/50 |
| 4,398,589 | 8/1983 | Eldred | 222/594 |

FOREIGN PATENT DOCUMENTS

| | | | |
|---|---|---|---|
| 0043066 | 6/1981 | European Pat. Off. | |
| 0095620 | 5/1983 | European Pat. Off. | |
| 29508 | 12/1965 | Japan | 417/50 |
| 847492 | 9/1960 | United Kingdom | 417/50 |

*Primary Examiner*—William L. Freeh
*Attorney, Agent, or Firm*—Herbert L. Lerner; Laurence A. Greenberg

[57] ABSTRACT

Method for conveying liquid metal by means of two series-connected electromagnetic pumps, of which one is an immersion pump and the other a canal pump, characterized by the feature that the immersion pump is continuously operated with low or medium output and the dosing and/or control of the liquid-metal flow is accomplished by connecting the canal pump aiding or bucking.

7 Claims, 1 Drawing Figure

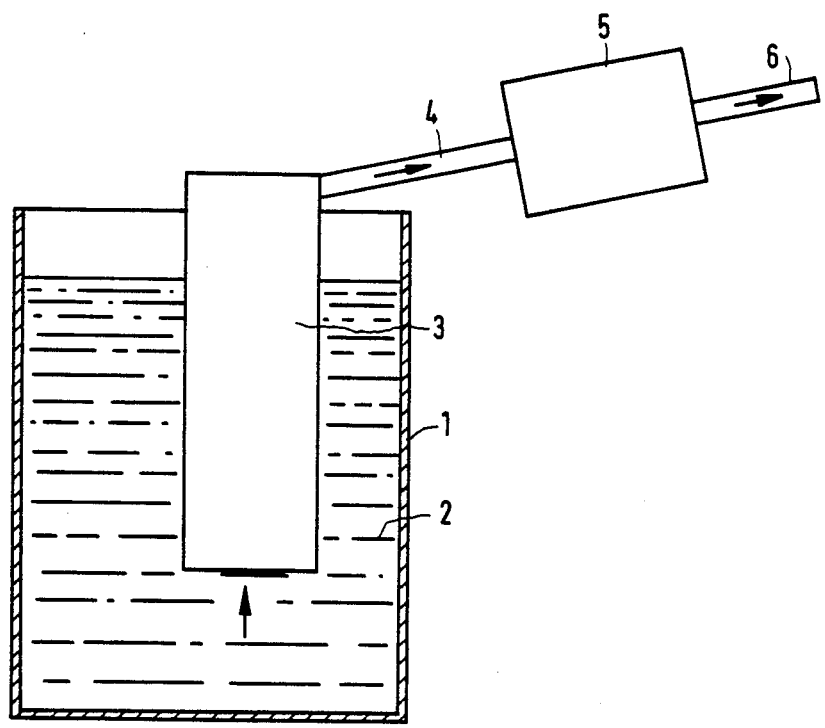

METHOD FOR CARRYING LIQUID METAL BY TWO SERIES-CONNECTED ELECTRIC MAGNET PUMPS

BACKGROUND OF THE INVENTION

1. Field of the Invention

The present invention relates to a method for conveying liquid metal and, more particularly, refers to a new and improved method of precise metering in pouring liquid metal as well as dosing the liquid metal.

2. Description of the Prior Art

Electromagnetic pumps and circuits for operating them are known, for instance, from European Pat. EP-No.-B1-00 43 066 which includes a description of an electromagnetic canal pump, EP-No.-A2-00 77 498 and corresponding U.S. application No. 430,543, filed Sept. 30, 1982 discloses an induction immersion pump, especially for transporting molten aluminum. A device for controlling such a pump is described in EP-No.-A2 00 95 620. In some cases, it may be desirable for technical reasons to connect two electromagnetic pumps in series, with one pump designed as an immersion pump and the other as a canal pump. In such combined pump arrangement, the immersion pump could be used, for instance, only for flooding the canal pump and then be switched off in the subsequent operation to prevent overheating. However, it has been found that for certain operating conditions, especially for the precise dosing of individual portions, that a different type of cooperation of the two pumps is needed.

SUMMARY OF THE INVENTION

An object of the present invention is to provide a method for operating two series-connected electromagnetic pumps, which permits particularly precise metering and dosing in pouring liquid metal in continuous operation.

With the foregoing and other objects in view, there is provided in accordance with the invention, a method for feeding controlled amounts of molten metal from a body of molten metal in a vessel, which comprises continuously operating an electromagnetic immersion pump immersed in the body of molten metal at a fixed output, discharging the output of the immersion pump through a conveying canal extending outside the body of molten metal, conveying the output from the conveying canal into an electromagnetic canal pump connected thereto, operating the canal pump at intervals to pump with a given output for a given time together with the immersion pump in the same direction of flow of molten metal, operating the canal pump at other intervals to pump in a reverse direction which is counter to the flow of metal from the immersion pump, and discharging controlled amounts of molten metal from a discharge opening in the canal pump.

Other features which are considered as characteristic for the invention are set forth in the appended claims.

Although the invention is illustrated and described herein as embodied in method for conveying liquid metal by two series-connected electro-magnetic pumps, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates apparatus for carrying out the invention wherein a body of liquid-metal melt such as molten aluminum in a tank is the charging material to be fed in controlled amounts. An electromagnetic immersion pump in the body of molten metals continuously operates at a fixed rate to withdraw some molten metal from the body of metal through an inlet or suction opening in the immersion pump and discharge it through a discharge opening in the pump into a conveying canal which extends outside the body of molten metal. The flow of metal continues through the conveying canal into an electromagnetic canal pump connected to the conveying canal. By operating the canal pump for a given time at a given rate and in the same direction of flow as the immersion pump, there will be discharged from an opening the canal pump and connecting discharge pipe, a controlled amount of molten metal. Thereupon, the canal pump is operated with reverse output, i.e. counter to the output of the immersion pump to terminate discharge of molten metal from the discharge pipe, and this condition can be maintained for the interval desired. For convenience, this interval may be called a "rest interval" as compared to a "charge interval" in which controlled amounts of metal are discharged. After a rest interval, a charge interval is effected simply by operating the canal pump in a reverse flow direction. The immersion pump continues to operate in the same direction.

DETAILED DESCRIPTION OF THE INVENTION

In accordance with the invention, the immersion pump is continuously operated with low or medium output, usually about half the rated capacity to a value which is a quarter or less of the rated capacity, and the dosing and/or control of the liquid metal flow is accomplished by switching the canal pump aiding or bucking the immersion pump. This method has decisive advantages in which not only the continuous output is to be controlled, but precise dosing is required. If the canal pump is operated with low output, the flow of liquid metal can be stopped almost immediately by counter-connecting the canal pump, i.e. causing the canal pump to pump in the reverse direction. Depending on the counter-connected or reverse output of the canal pump, the liquid metal level assumes some position in the interior of the canal pump. By accurately fixing the output of the immersion pump and the counter-output of the canal pump, the liquid-metal level can be put accurately in a defined position during standstill, i.e. when the flow of liquid metal stops. The next portion of liquid metal is pump by connecting the canal pump again to pump with a given output for a given time together with the immersion pump instead of counter to the immersion pump. In favorable cases, very accurate proportioning is thus obtained merely by operating the immersion pump with a fixed output and by connecting the canal pump to operate at intervals in aiding the flow of metal from the immersion pump or bucking the flow of liquid from the immersion pump without the need for elaborate instrumentation and control.

In a specific embodiment of the invention, the output of the immersion pump is controlled so that the liquid-metal pressure is always the same at the input of the canal pump if there is no convection. Since the liquid-metal level in the tank does not remain constant and the output of the immersion pump depends on the filling level in the tank, it is advantageous in order to reach a defined liquid-metal level in the canal pump when there is no convection, that the change in filling level in the tank by compensated by the immersion pump. For this the filling level in the tank is measured and the electrical input of the immersion pump is raised in inverse proportion to that level. Then, the canal pump requires no elaborate control devices for permanently accurate dosing. The output of the immersion pump is controlled dependent on the filling level in the tank and, if significant and required, on the temperature and other parameters which can be measured and affect the output of the immersion pump.

A basic sketch of the arrangement of two series-connected electromagnetic pumps is shown in the drawing.

In the tank 1 there is a liquid-metal melt 2, into which an electromagnetic immersion pump 3 is immersed. As indicated by arrows, the liquid metal is conducted through the immersion pump and via the conveying canal 4 to a canal pump 5, from where it is then transported to a discharge pipe 6. The start of the pumping can be accomplished by the immersion pump 3. The heretofore necessary flooding of the canal pump from the outside is now no longer required.

In the proposed method, the conveying canal 4 and discharge pipe 5 of the canal pump 5 are inclined upwards, and this is desirable for a feedpipe as it prevents dripping. However, the inclination need not be great, a small slope of less than 30° is adequate for this purpose.

The foregoing is a description corresponding, in substance, to German application No. P 33 22 122.7, dated June 30, 1983, the International priority of which is being claimed for the instant application, and which is hereby made part of this application. Any material discrepancies between the foregoing specification and the specification of the aforementioned corresponding German application are to be resolved in favor of the latter.

There are claimed:

1. Method for feeding controlled amounts of molten metal from a body of molten metal in a vessel, which comprises continuously operating an electromagnetic immersion pump immersed in the body of molten metal at a fixed output, discharging the output of the immersion pump through a conveying canal extending outside the body of molten metal, conveying the output from the conveying canal into an electromagnetic canal pump connected thereto, operating the canal pump at intervals to pump with a given output for a given time together with the immersion pump in the same direction of flow of molten metal, operating the canal pump at other intervals to pump in a reverse direction which is counter to the flow of metal from the immersion pump, and discharging controlled amounts of molten metal from a discharge opening in the canal pump.

2. Method according to claim 1, wherein the immersion pump operates continuously at a fixed output which is less than half the rated capacity of the immersion pump.

3. Method according to claim 1, wherein the canal pump is operated at an output in a reverse direction which is counter to the flow of metal from the immersion pump to form a liquid metal level in the interior of the canal pump.

4. Method according to claim 2, wherein the canal pump is operated at an output in a reverse direction which is counter to the flow of metal from the immersion pump to form a liquid metal level in the interior of the canal pump.

5. Method according to claim 1, wherein the output of the immersion pump is controlled to give a liquid-metal pressure which is always the same at the input of the canal pump.

6. Method according to claim 2, wherein the output of the immersion pump is controlled to give a liquid-metal pressure which is always the same at the input of the canal pump.

7. Method according to claim 3, wherein the output of the immersion pump is controlled to give a liquid-metal pressure which is always the same at the input of the canal pump.

* * * * *